United States Patent [19]
Khoe et al.

[11] Patent Number: 5,371,622
[45] Date of Patent: Dec. 6, 1994

[54] COHERENT OPTICAL TELECOMMUNICATION NETWORK WHEREIN EACH SEND/RECEIVE TERMINAL CAN SIMULTANEOUSLY COMMUNICATE WITH MORE THAN ONE OTHER SEND/RECEIVE TERMINAL

[75] Inventors: Giok D. Khoe; Pieter W. Hooijmans; Johannes T. M. Kluitmans, all of Eindhoven, Netherlands

[73] Assignee: U.S. Philips Corporation, New York, N.Y.

[21] Appl. No.: 910,953

[22] Filed: Jul. 9, 1992

[30] Foreign Application Priority Data

Jul. 15, 1991 [EP] European Pat. Off. ......... 91201841.3

[51] Int. Cl.[5] .............................................. H04B 10/06
[52] U.S. Cl. ................................... 359/152; 359/113; 359/114
[58] Field of Search ............... 359/152, 154, 114, 124, 359/126, 162, 182, 158, 191, 123, 113; 375/59; 356/5; 370/57; 455/42

[56] References Cited

U.S. PATENT DOCUMENTS

| | | | |
|---|---|---|---|
| 4,635,246 | 1/1987 | Taylor et al. | 359/191 |
| 4,817,207 | 3/1989 | Smith et al. | 455/617 |
| 4,989,200 | 1/1991 | Olshansky et al. | 370/3 |
| 5,119,223 | 6/1992 | Panzer et al. | 359/114 |
| 5,121,241 | 6/1992 | Veith | 359/191 |
| 5,134,509 | 7/1992 | Olshansky et al. | 359/132 |

FOREIGN PATENT DOCUMENTS 0359205  3/1990  European Pat. Off. ................ 370/3

OTHER PUBLICATIONS

Optical Fiber Communication Conference, San Diego, Calif., Feb. 18–22, 1991, p. 183.
A. A. M. Saleh and H. Kogelnik, Reflective Single-Mode Fiber-Optic Passive Star Couplers, IEEE, Journal of Ligthwave Tech., vol. 6, No. 3, Mar. 1988, pp. 392–398.
IEEE Journal on Selected Areas in Communication, vol. 8, No. 7, Sep. 1990, pp. 1290–1295.
Optical Communicaiton (ECOC '89), Sep. 10–14, 1989, vol. 1, pp. 415–420.
C. Desem, Optical Interference In Subcarrier Multiplexed Systems with Multiple Optical Carriers, 1990 IEEE, pp. 1363–1369.
2Gbit/s, Subcarrier Multiplexed Coherent Lightwave System, Electronics Letters, 28 Sep. 1989, vol. 25, No. 20, pp. 1368–1369.
Proc. 15th European Conference on Optical Communication, vol. 1, Gathersburg, Sep. 10–14, 1989, pp. 417–420.
Electronics Letters, vol. 25, No. 20, Sep. 28, 1989, pp. 1368–1369, Hill et al.

Primary Examiner—Richard E. Chilcot, Jr.
Assistant Examiner—Richard A. Moller
Attorney, Agent, or Firm—Leroy Eason

[57] ABSTRACT

In an optical telecommunication system having a direct-access optical transmission medium, a plurality of send-/receive terminals may communicate with each other on different optical carriers. In order to make it possible for a terminal which is already in communication with a second terminal to also transmit to or receive a message from a third terminal, each terminal includes modulation and demodulation circuits for modulating-/demodulating particular message signals on particular subcarriers. Signals received from different terminals can thereby be distinguished from each other on the basis of their respective subcarriers.

4 Claims, 2 Drawing Sheets

COHERENT OPTICAL TELECOMMUNICATION NETWORK WHEREIN EACH SEND/RECEIVE TERMINAL CAN SIMULTANEOUSLY COMMUNICATE WITH MORE THAN ONE OTHER SEND/RECEIVE TERMINAL

BACKGROUND OF THE INVENTION

The invention relates to a telecommunication system comprising a transmission medium simultaneously accessible to at least three terminals, each terminal comprising a send oscillator coupled to the transmission medium via send means and, means for modulating the output signal of the send means. The transmission medium is also coupled to an input of receive means in each terminal, the output of the receive means being coupled to demodulation means for obtaining a demodulated signal from an input signal to the receive means.

Such a telecommunication system is known from the conference lecture "TBOSS—A transparent optical subscriber system with full duplex multi-access provided by tunable coherent single laser transceivers", Proc. OFC., Feb. 18–22, 1991, San Diego, p. 183, paper ThN3.

For realizing telecommunication systems which make communication among a plurality of terminals possible and which require little or no switching equipment, a transmission medium can be utilized that is simultaneously accessible to all the terminals.

Examples of such a transmission medium are a coaxial cable, a radio channel and a so-called reflective optical star network. Such a transmission medium has a given number of ports. If a signal generated by a send oscillator is sent through one of these ports, this signal is distributed over all the ports of the transmission medium. A signal supplied to the transmission medium by a terminal can thus be received by all the other terminals. The send oscillator may be an electrical oscillator or an optical oscillator such as, for example, a LED or a laser.

For transporting a baseband signal through such a transmission medium, the signal from a send oscillator is amplitude, frequency or phase modulated by the baseband signal with the aid of the modulation means before the oscillator signal is fed to the transmission medium.

In order to permit more than two terminals to use the transmission medium simultaneously, measures are necessary for avoiding mutual interference. A method of achieving this is to define time slots in which, alternately, only one of the terminals supplies a signal to the network.

A disadvantage of this method is that the network is not always used as efficiently as possible. For example, if only one terminal is supplying a message to the network, the channel is not utilized during the time slots reserved to the other terminals.

In such a case it is better to make the transmission medium fully available to that single terminal. A problem is then that with the known telecommunication system a terminal receiving information from another terminal cannot receive any information from a further terminal. However, this is often desired for sending urgent messages to the receiving terminal. Neither is it possible in the known telecommunication system for a terminal to send simultaneously two or more different messages to one or more terminals.

It is an object of the invention to provide a telecommunication system as described above, in which simultaneous communication between any particular terminal and one or more other terminals is possible.

For this purpose, the invention is characterized in that an input of the aforesaid modulation means is coupled to an output of further modulation means for modulating at least one further baseband signal to be transmitted on an associated subcarrier, and an output of the aforesaid demodulation means is coupled to further demodulation means for deriving at least one further baseband signal from the demodulated signal.

By way of these measures it is possible for an additional terminal to communicate with a first and/or a second terminal by supplying a further signal to the transmission medium while concurrently modulating on a subcarrier the baseband signal intended for the first and/or second terminal.

In the demodulated signal obtained at the first and/or second terminal there are now two (or more) signals coming from different terminals. Since at least one of the signals is modulated on a subcarrier, the frequency spectrums of the signals do not overlap and the signals coming from different terminals may be separated in the receiver simply by means of filters.

It is possible for the baseband signal from one of the terminals not to be modulated on a subcarrier, but only the baseband signal(s) from the further terminal(s) to have been modulated on a different subcarrier (on different subcarriers). Alternatively, it is possible for the baseband signals from all the terminals to have been modulated on individual subcarriers.

An embodiment of the invention is characterized in that the send oscillator is tunable, the receive means comprise mixer means, the input of the receive means is coupled to a first input of the mixer means, each of the terminals comprise a receive oscillator whose output is coupled to a second input of the mixer means, and the output of the mixer means is coupled to the output of the receive means.

These measures achieve that the maximum amount of information that can be transported through the transmission medium may be much larger than the amount of information that can be supplied to the transmission medium per unit of time by a single terminal. The latter amount is restricted by the limited speed of the electronic circuits in the sending terminal.

If the bandwidth of the transmission medium is such that the transmission capacity is much larger than the amount of information that can be supplied per unit of time by a single transmitter, different carriers for different simultaneously transmitting stations can be utilized to advantage if the send oscillator is tunable. Consequently, the total amount of information transported through the transmission medium may be much larger than the amount of information transmitted by a single terminal.

Certainly with known optical reflective star networks the use of different optical carriers may be highly advantageous, because the available bandwidth of such networks may be several hundred GHz.

Heterodyne receivers are used for a receiving terminal to receive, without utilizing complex tunable optical filters, from one of a plurality of terminals transmitting at different frequencies. In these receivers the received signal is converted into an intermediate frequency signal having a much lower intermediate frequency, so that the intermediate-frequency signal may be processed with the aid of conventional electronic components. For this purpose, the signal received by a terminal is converted by mixer means to the intermediate frequency via a signal generated by the receive oscillator. In this manner an intermediate-frequency signal is obtained having a frequency equal to the difference frequency between that of the received signal and the frequency of the signal generated by the receive oscillator.

In the telecommunication system known from aforementioned conference lecture, the send oscillator and the receive oscillator are formed by a laser. The mixer means here consist of an optical directional coupling and a photodiode. The mixer means convert the received light signal having a very high frequency, for example, $10^{14}$ Hz, into an intermediate-frequency signal having a much lower frequency, for example 3 GHz.

A further embodiment of the invention is characterized in that the send oscillator and the receive oscillator comprise a single shared oscillator.

As has already been explained in afore-mentioned conference lecture, the use of only a single oscillator both as the send oscillator and the receive oscillator realizes a considerable saving. In order to make the use of only a single oscillator possible, the frequency of the oscillator of the first terminal must differ from the frequency of the oscillator in the second terminal by a value equal to the intermediate frequency. As a result, both in the receiver of the first terminal and the receiver of the second terminal the desired intermediate-frequency signal is available at the output of the mixer means.

If more than two terminals utilize the same pair of carriers, these two terminals may be divided into two groups; i.e., a group of terminals transmitting a carrier with a first frequency and a group of terminals transmitting a carrier with a second frequency, the difference between the first and second frequencies being equal to the intermediate frequency. In this situation all the terminals from the first group can communicate with all the terminals from the second group.

A further embodiment of the invention is characterized in that the modulation means comprise control means of the send oscillator.

In the prior-art telecommunication system the modulation means comprise an external modulator inserted between the oscillator (laser) and the send means. The use of a single laser as a send oscillator and also as a receive oscillator is further known from the conference lecture "Coherent 565 Mbit/s DPSK Bidirectional Transmission Experiment with Local Transceiver Lasers", Proceedings 15th European Conference on Optical Communication, Vol. 1, Gothenburg, Sep. 10-14, 1989, pp. 417-420, paper ThA21-7.

The external modulators that may be utilized for this purpose are rather expensive, however, and cause considerable attenuation of the signal generated by the oscillator (laser). By modulating the oscillator (laser) directly, the external modulator is no longer necessary.

When a terminal simultaneously transmits and receives, the intermediate-frequency signal coming from the terminal has both the modulation of the signal to be transmitted and the modulation of the received signal. Selection of the modulation method must take into account that the modulation of the transmitted signal should be distinguishable from the modulation of the received signal.

An example of such a modulation method is amplitude modulation with a relatively small depth of modulation. The frequency spectrum of the signal transmitted by a specific terminal then consists of a carrier having two sidebands at a distance from the carrier equal to the frequency of the subcarrier.

If this terminal receives from a further terminal a similar signal having a different carrier frequency and a different subcarrier frequency, the output of the mixer means will be an intermediate-frequency signal essentially consisting of a carrier and two pairs of sidebands. One pair of sidebands comes from the further terminal and the other pair of sidebands comes from the first terminal itself. Although there may also occur mixing products of the sidebands generated by the first and the further terminal, the magnitude of the mixing products may be restricted if the modulation depth is selected to be sufficiently small. The different signals may then be simply separated with the aid of electrical filters.

A further embodiment is characterized in that the modulation means comprise angle modulation means and in that the demodulation means comprise angle demodulation means.

It appears that when angle modulation (for example, phase or frequency modulation) is used no undesired mixing products occur, as a result of which the information transmitted by the two terminals can be separated free of distortion. This will be clarified as follows.

The light carrier signal $L_t$ generated by the laser oscillator in a terminal can be written:

$$L_t = A \cdot \sin(\omega_1 t + \Delta\psi \cdot s_1(t)) \qquad (1)$$

In (1) $\omega_1$ is the angular frequency of the light signal $L_t$, $\Delta\psi$ is the angle modulation constant and $s_1(t)$ the signal to be modulated on the light signal. The received signal $L_r$ can be written:

$$L_r = B \cdot \sin(\omega_2 t + \Delta\psi \cdot s_2(t)) \qquad (2)$$

In (2) $\omega_2$ is the angular frequency of the signal $L_r$ and $s_2(t)$ is the baseband signal modulated on the received signal.

In the mixer means an intermediate-frequency signal is determined by summing the two signals $L_t$ and $L_r$ and, subsequently, determining the power of this sum signal. For the sum $L$ of the signals $L_t$ and $L_r$ the following holds:

$$L = (A+B)\cos\left(\frac{\omega_0 - \omega_1}{2} t + \Delta\psi \frac{s_1(t) - s_2(t)}{2}\right)\sin\left(\frac{\omega_0 + \omega_1}{2} t + \Delta\psi \frac{s_1(t) + s_2(t)}{2}\right) + (A-B)\sin\left(\frac{\omega_0 - \omega_1}{2} t + \Delta\psi \frac{s_1(t) - s_2(t)}{2}\right)\cos\left(\frac{\omega_0 + \omega_1}{2} t + \Delta\psi \frac{s_1(t) + s_2(t)}{2}\right) \qquad (3)$$

The mean power $|L|^2$ of the signal $L$ is:

$$|L|^2 = A^2 + B^2 + 2 A \cdot B \cdot \cos\{(\omega_0 - \omega_1)t + \Delta\psi[s_1(t) - s_2(t)]\} \qquad (4)$$

Since the mixer means produce an intermediate-frequency signal that is proportional to the variations in the mean power $|L|^2$ of the received signal, the following holds for this intermediate-frequency signal S:

$$S = \alpha \cdot A \cdot B \cdot \cos\{(\omega_0 - \omega_1)t + \Delta\psi[s_1(t) - s_2(t)]\} \quad (5)$$

Herein $\alpha$ is a constant.

The intermediate-frequency signal may also be determined in a different manner, for example, by multiplying $L_r$ and $L_t$, but this will lead to a result similar to the result of formula (5).

If the laser is phase modulated, the signals $s_1$ and $s_2$ are the baseband signals (modulated on a subcarrier, if available). At the output of the demodulation means a demodulated signal $s_u$ is then available after phase demodulation, which signal is proportional to the phase of the AC component in the signal $|L|^2$. For this demodulated signal it then holds: $s_u = C_1[(s_1(t) - s_2(t)]$, where $C_1$ is a demodulation constant.

If the laser is frequency modulated, the signals $s_1$ and $s_2$ are equal to:

$$s_1(t) = \int_{-\infty}^{t} s'_1(\tau)d\tau \quad s_2(t) = \int_{-\infty}^{t} s'_2(\tau)d\tau$$

Herein $s'_1(t)$ and $s'_2(t)$ are the baseband signals (modulated on a subcarrier, if available). At the output of the demodulation means a demodulated signal $s_u$ is then available after frequency demodulation, which signal is proportional to the amplitude of a signal that is proportional to the first derivative with respect to time of the signal $|L|^2$. For this signal it then holds: $s_u = C_2 \cdot (s'_1(t) - s'_2(t))$, wherein $C_2$ is a demodulation constant. The relation between the modulated signal and the baseband signal with phase and frequency modulation is described, for example, in the book entitled "Communication Systems" by A. Bruce Carlson, pp. 220-253 (ISBN 0-07-009957-X).

If at least one of the signals $s_1$ or $s_2$ ($s'_1$ or $s'_2$) comprises a subcarrier-modulated baseband signal, the two baseband signals may simply be separated by means of filters. In addition, from the equations for $s_u$ it follows that only the signals $s_1$ and $s_2$ are present in the demodulated signal and that undesired distortion terms are completely absent.

A further embodiment of the invention is characterized in that the further modulation means comprise means for modulating at least two baseband signals on two individual subcarriers, and the further demodulator comprises means for obtaining at least two baseband signals from the demodulated signal.

These measures make it possible to realise a full duplex connection between a first and a second terminal, while facility is provided for a third terminal to send messages to the first or second terminal.

BRIEF DESCRIPTION OF THE DRAWING

The invention will now be further explained with reference to the drawing Figures, in which:

In FIG. 1 a transmission medium simultaneously accessible to at least two terminals, in this case the medium being an optically reflective star network 1, is connected to an exchange 2 and a plurality of terminals of which only four 3, 4, 5 and 6 are shown here. The reflective star network (coupler) distributes a light signal fed to the network by one of the terminals or by the exchange over all the terminals, so that a signal fed to the network by one of the terminals or by the exchange may be received by all the terminals. Such a star coupler is known from the journal article "Reflective single-mode fibre-optic passive star couplers" by A. A. M. Saleh and H. Kogelnik in Journal of Lightwave Technology, Vol. 6, March 1988, pp. 392-398.

Figure 1:
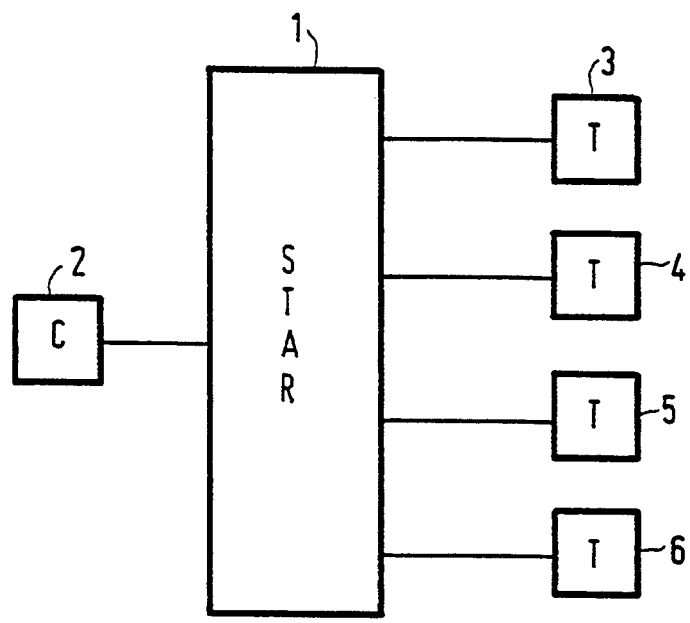
FIG. 1 shows a telecommunication system according to the invention, comprising an optically reflective star network, an exchange and a plurality of terminals.
Figure 2:
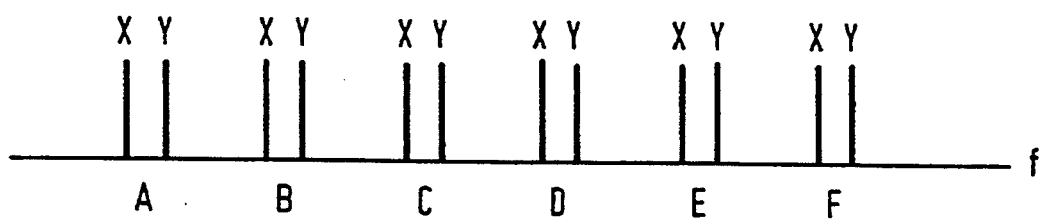
FIG. 2 shows the frequency division of a plurality of available optical channels.

It is assumed that the terminals may be tuned to one of a number of different optical carriers, such as is represented in FIG. 2. The channel A is reserved as an auxiliary channel. On this auxiliary channel all signalling takes place between the exchange and the terminals. If the terminals are not active, they are tuned to the carrier A (FIG. 2) for receiving information from the exchange or for sending information to the exchange. It is then assumed that carrier x in channel A is used for transporting information from the exchange to the terminals and that channel y is used for transporting information from the terminals to the exchange. Needless to observe that it is alternatively possible that a single carrier x could suffice per channel, the communication between exchange and terminals then taking place in the half-duplex mode.

If a terminal wishes to have a connection to another terminal, the exchange is informed of this through the auxiliary channel. For avoiding terminals simultaneously placing messages on the auxiliary channel and mutually disturbing one another, access to the auxiliary channel is controlled by a protocol. There are many conceivable options for this protocol, such as, for example, the exchange alternately polling the terminals, a fixed time slot in a frame being reserved for each terminal, or the use of so-called random-access techniques. These and other protocols are described in the book entitled "Integrated Digital Communications Networks", Vol. 2 by G. Pujolle et al., pp. 113-153, ISBN 0471-914223.

If the terminal to be called is free, the exchange announces both to the calling terminal and the called terminal on which optical carrier they are to exchange their messages. The exchange then provides that only channels which are still free can be allocated to a pair of terminals. In the case of a full duplex connection the calling terminal transmits, for example, on carrier x and the called terminal on carrier y. Once the exchange of messages between the two terminals has finished, the calling terminal may announce this to the exchange so that the channel used may again be released to other terminals.

If the called terminal has already been seized by a calling terminal, it is nevertheless possible according to the present invention for a second calling terminal to communicate with this called terminal by means of a baseband signal modulated on a subcarrier. For this purpose, the exchange informs the second calling terminal to which channel and which carrier (x or y) the terminal has already tuned its receiver. Furthermore, the exchange may inform the second calling terminal which subcarrier is to be used. The calling terminal may then tune its transmitter accordingly and start communicating with the called terminal. If more than one subcarrier are provided, it is possible for several other terminals to communicate simultaneously with an already seized terminal.

If the terminals each comprise only a single laser, the frequency difference between the carriers x and y for a full-duplex connection between two terminals should be equal to the intermediate frequency in the terminals. If the modulation means directly modulate the light generated by the laser, for a full duplex connection between two terminals at least one of the baseband signals is modulated on a subcarrier so as to distinguish between the two baseband signals after transmission. Angle modulation is then preferably selected as has already been explained hereinbefore.

Figure 3:
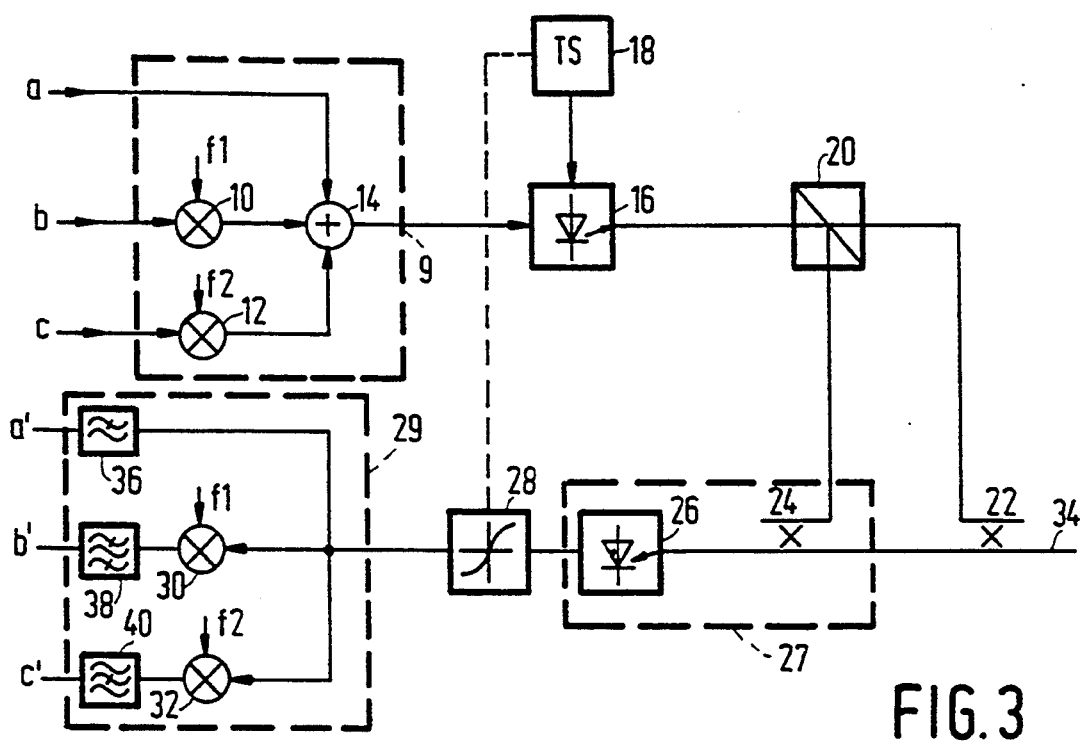
FIG. 3 shows an embodiment of a terminal suitable for use in a network as shown in FIG. 1.

In the terminal shown in FIG. 3 an input a is connected to a first input of an adder 14. An input b is connected to a first input of a multiplier 10. A signal having a frequency $f_1$ is applied to a second input of the multiplier 10, the output of the multiplier 10 being connected to a second input of the adder 14. An input c is connected to a first input of a multiplier 12. A signal having a frequency $f_2$ is applied to a second input of the multiplier 12, the output of the multiplier 12 being connected to a third input of the adder 14. The multipliers 10 and 12, combined with the adder 14, form a send modulator 9 which constitutes the further modulation means according to the invention.

The output of the adder 14 is connected to the input of optical modulation means which in this case is simply a control input of a send oscillator 16. The modulation means may control the amplitude of the oscillator to produce an amplitude modulation, but preferably produces frequency modulation of the oscillator. The oscillator 16 is in this case an optical laser. A tuning element 18 is also connected to the laser 16. The output of the laser 16 is connected to a splitter unit 20 a first output of which is coupled to the optical fibre 34 by an optical coupling element 22.

The optical fibre 34 is also coupled to the receive stage 27 of the terminal by the optical coupling element 22. In this case, the receive stage 27 is a mixer which is connected to the input of a frequency demodulator 28. The mixer comprises an optical coupling element 24, a first input of which forms an input of the mixer, and a photodiode 26. A second output of the splitter unit 20 is connected to a second input of the coupling element 24. The output of the photodiode 26 forms the output of the receive stage 27. This output is coupled to an input of a demodulator 28. This may be an amplitude demodulator but, is preferably a frequency demodulator.

The output of the demodulator 28 is connected to the input of a receive demodulator 29. The input of the receive demodulator 29 is connected to a low-pass filter 36, a first input of a multiplier 30 and a first input of a multiplier 32. A signal having a frequency $f_1$ is applied to a second input of the multiplier 30. A second input of the multiplier 32 is supplied with a signal having a frequency $f_2$. The output of the multiplier 30 is connected to an input of a low-pass filter 38, whereas the output of the multiplier 32 is connected to the input of a low-pass filter 40. The output signal of the low-pass filter 36 is available at the output a'. At the outputs b' and c' respectively, the output signals of the low-pass filters 38 and 40 are available.

If a full duplex connection is to be established between two terminals as shown in FIG. 3, in the first of these terminals the baseband signal $s_1$ which is to be transmitted will be applied to the input a of send modulator 9 of that terminal and in the second terminal the baseband signal $s_2$ which is to be transmitted will be applied to the input b of send modulator 9 of that terminal. In this example the baseband signals may be data signals having a transmission rate of 100 Mbit/s. At the output of the adder 14 in send modulator 9 of the first terminal the baseband signal $s_1$ to be transmitted will be present, whereas at the output of adder 14 in send modulator 9 of the second terminal there will be a dual sideband modulated subcarrier signal with suppressed subcarrier, which modulated subcarrier includes the baseband signal $s_2$.

Frequency modulation is preferably used because the baseband signals which are modulated on a subcarrier are then available undistorted in the intermediate-frequency signal.

The output signal of the send modulator 9 causes frequency modulation of the light emitted by the laser 16. The frequency swing of the light signal in this example is 1 GHz. Part of this modulated light is fed to the optical fibre 34 by way of the splitter unit 20 and the coupling element 22. In the coupling element 24 the light received from the optical fibre 34 is combined with the remaining part of the light generated by the laser 16. This combination of light signals is applied to the photodiode which produces an intermediate-frequency electrical signal that is representative of the combination of amplitude of the light signals at the input thereof. Since the carrier frequencies of the two light signals differ by a value equal to a desired intermediate frequency, the intermediate-frequency electrical signal at the output of the photodiode 26 will have the desired centre frequency. The value of the intermediate centre frequency applicant has used in this system is 3 GHz.

In order to guarantee that, despite temperature variations, the frequency difference between lasers in the first and second terminals between which connection is established remains equal to the desired intermediate frequency, it is possible to provide in either terminal an additional output which carries a signal proportional to the frequency of the intermediate-frequency signal produced at the output of the frequency demodulator 28. Such output signal can be supplied to an input of the tuning element 18. This makes it possible to properly adapt the frequency of the laser on the basis of the frequency of the output signal of the frequency demodulator, so that the intermediate frequency in maintained at the desired value. Such a control is also termed automatic frequency control (AFC).

Subsequent to (FM) demodulation in the demodulator 28, there will be present at the output thereof in each of the two terminals a signal which contains both the signal $s_1$, and the signal $s_2$ modulated on a subcarrier having a frequency $f_1$. By means of the multipliers 30 and 32 and filters 36 and 38, these two signals can be separated. The signal $s_1$ is further processed in the second terminal, whereas the demodulated signal $s_2$ is further processed in the first terminal. If so desired, it is also possible to monitor in a terminal the signal transmitted by that terminal. It should then be considered that, as has already been rated before the baseband signal transmitted on the optical carrier that has the lowest frequency will be sign inverted. This may be remedied by inverting the baseband signal prior to feeding it to the send modulator; or by inverting it after demodulation and filtering in the receive demodulator.

If a third terminal wishes to send a signal to the first terminal, this signal is to be applied to the input c of the third terminal and so it will be modulated on a subcarrier having a frequency $f_2$. In addition, the third terminal is to tune its laser to the same frequency as the second terminal so as to be received by the first terminal. The signal coming from the third terminal will then be available at output c' of the first terminal. Further terminals may similarly communicate with the first or the second terminal, but then it should be provided that a sufficient number of subcarriers can be used.

In a most simple embodiment of the invention the send oscillator is constituted by a LED or a laser 16 having a fixed frequency. The modulation means are then constituted by an amplitude control input of the laser (LED) 16. The mixer may then be completely omitted from the receive stage and the intermediate frequency demodulator may then also be omitted. The receive stage will therefore be constituted by the photodiode 26, which is directly coupled to the transmission medium. The effect of this simplification is that there will be only a single optical carrier available.

In order to avoid having mutually disturbing terminals that wish to feed messages to the transmission medium simultaneously, access to the transmission medium can be controlled by a protocol. For this purpose many options are conceivable, such as, for example, alternate polling of the terminals by the exchange, or the use of what is commonly referred to as random-access techniques. These and other protocols are described in afore-mentioned book by G. Pujolle et at.

If at a specific moment the channel is used by a first and a second terminal, according to the invention a third terminal can still send a message to the first or the second terminal by modulating its baseband signal on a subcarrier and by generating with the signal thus obtained an amplitude modulated light signal and feeding this to the network.

Figure 4:
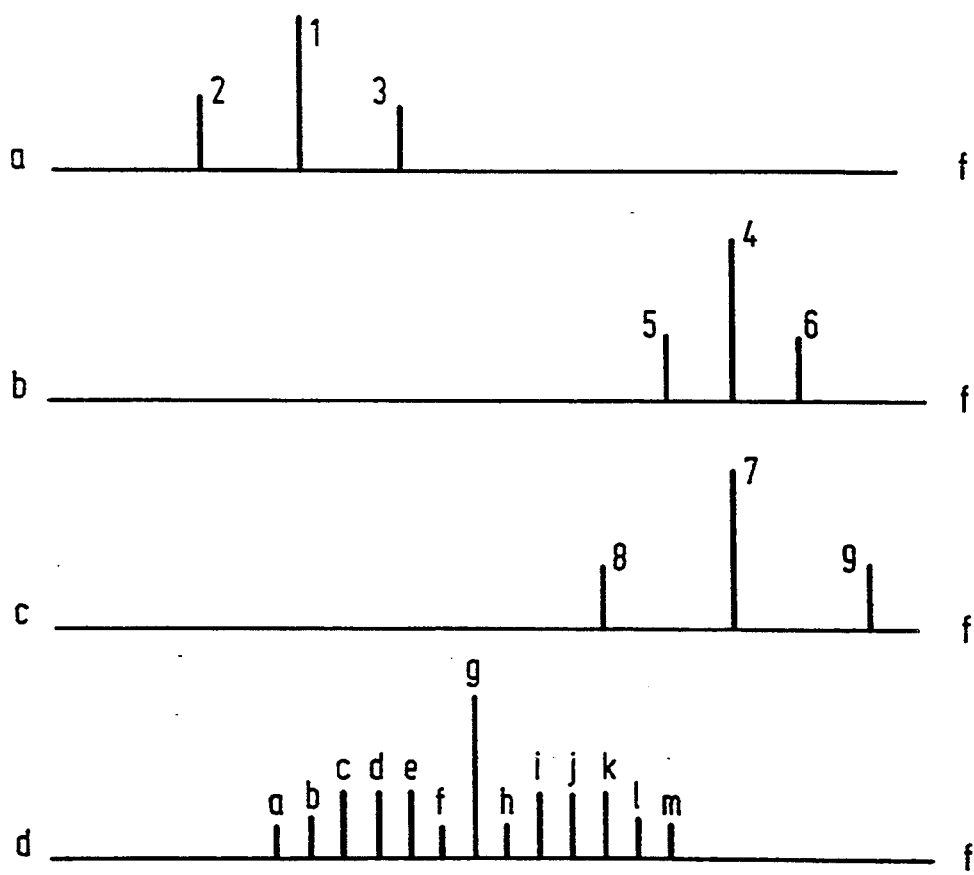
FIG. 4 shows the frequency spectrum which may occur at the output of demodulator 28 in the terminal as shown in FIG. 3 when amplitude modulation is used.

FIG. 4 shows various frequency spectrums when terminals as shown in FIG. 3 are used and amplitude modulation is employed, the first terminal maintaining a full duplex connection to the second terminal, and a third terminal sending a message to the first terminal. In FIG. 4a, FIG. 4b and FIG. 4c the respective frequency spectrums are shown of the signals transmitted by the first, the second and the third terminals. FIG. 4d shows the frequency spectrum of the intermediate-frequency signal in the first terminal.

The component g in FIG. 4d is the mixing product of the carrier 1 in FIG. 4a and the carrier 4 in FIG. 4b and the carrier 7 in FIG. 4c. The components e and i are the desired mixing products of the carrier 1 in FIG. 4b and the two sidebands 5 and 6 of FIG. 4b. These components contain information that is to be transferred from the second terminal to the first terminal.

The components d and j are the desired mixing products of the carrier 4 in FIG. 4b and the two sidebands 2 and 3 of FIG. 4a. These components contain the information to be transferred from the second terminal to the first terminal.

The components c and k are the desired mixing products of the carrier 1 in FIG. 4a and the two sidebands 8 and 9 of FIG. 4c. These components contain the information to be transferred from the third terminal to the first terminal.

The components a, b, f, h, l, m are unwanted mixing products of the sidebands 2 and 3 of FIG. 4a with the sidebands 5 and 6 of FIG. 4b, and with the sidebands 8 and 9 of FIG. 4c. The magnitude of the unwanted mixing products may be restricted by keeping the modulation depth of the amplitude modulation small.

Figure 5:
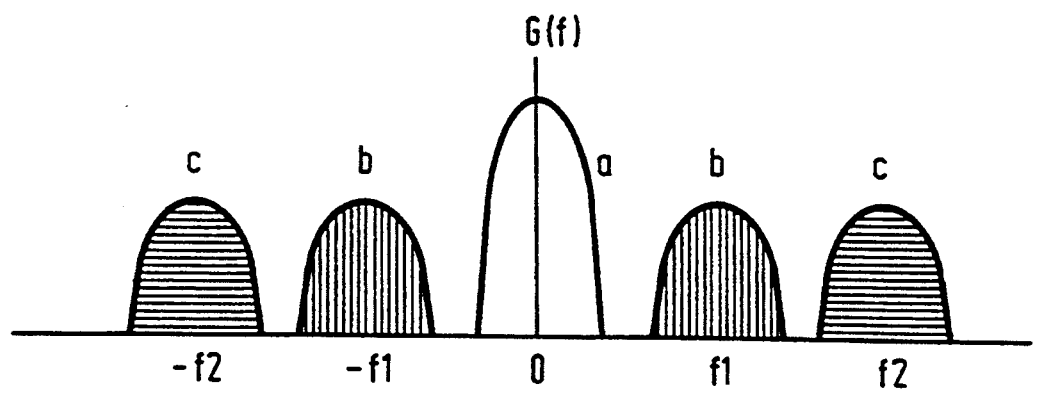
FIG. 5 shows the frequency spectrum which may occur at the output of the demodulator 28 in the terminal as shown in FIG. 3 when frequency modulation is used.

FIG. 5 shows the spectrum at the output of the demodulator 28 of the first terminal for from the situation in which frequency modulation is employed and in which this first terminal keeps up a full-duplex connection to a second terminal and while, simultaneously, a third terminal sends information to the first terminal.

The signal $s_1$, which is not modulated on a subcarrier, is transmitted by the first terminal and has a centre frequency equal to 0. The signal $s_2$ transmitted by the second terminal is modulated on the carrier frequency $f_1$, whereas the signal coming from the third terminal is modulated on a carrier having a frequency $f_2$. The signals desired in the first terminal are then available there at the outputs b' and c'. The values used for the frequencies $f_1$ and $f_2$ of the subcarriers are 200 MHz and 500 MHz. In the frequency spectrum as shown in FIG. 5 no undesired mixing products are produced. This is a result of the use of frequency modulation.

We claim:

1. An optical telecommunication network which comprises at least three send/receive terminals and an optical transmission medium to which all of said terminals are coupled and via which an optical wave transmitted by any terminal is conveyed to all terminals; each send/receive terminal comprising:

a send modulator which includes means for angle modulating a first baseband send signal on a subcarrier at a first subcarrier frequency, means for angle modulating a second baseband send signal on a subcarrier at a second subcarrier frequency, and means for combining the two modulated subcarriers with a third baseband send signal to form a composite send signal;

a send oscillator for generating an optical carrier wave at a first selected optical frequency;

optical modulating means for receiving said composite send signal from the send modulator and angle modulating the optical carrier wave generated by the send oscillator in accordance with said composite send signal;

optical coupling means for coupling the send oscillator to said transmission medium so that the angle modulated optical carrier wave is conveyed to all of the terminals in said network, said optical coupling means also being adapted to receive from said transmission medium angle modulated optical carrier waves transmitted from other terminals in said network;

optical demodulating means coupled to said optical coupling means for converting received angle modulated optical carrier waves which are at a second selected optical frequency into a modulated intermediate frequency electrical signal having a predetermined center frequency;

intermediate frequency demodulating means coupled to the optical demodulating means for demodulating the modulated intermediate frequency signal to recover therefrom composite send signals included therein; and a receive demodulator coupled to said intermediate frequency demodulating means for receiving the recovered send signals, said receive demodulator including means for mixing the recovered send signals with a subcarrier at said first subcarrier frequency to derive a first baseband receive signal, means for mixing the recovered send signals with a subcarrier at said second subcarrier frequency to derive a second baseband receive signal, and means for filtering the recovered send signals to derive therefrom a third received baseband signal which is included therein and is not modulated on a subcarrier;

whereby any pair of terminals can engage in full duplex communication by transmission in one direction over said transmission medium on an optical carrier wave at said first selected optical frequency and transmission in the other direction over said transmission medium on an optical carrier wave at said second selected optical frequency, and either of said pair of terminals can simultaneously communicate with a third terminal on an optical carrier wave at one of said first and second selected optical frequencies.

2. An optical telecommunication network as claimed in claim 1, wherein said optical coupling means comprises beam splitting means for coupling a portion of the angle modulated optical carrier wave generated by the send oscillator to said optical demodulating means, said optical demodulating means mixes said portion of the generated angle modulated optical carrier wave with a received angle modulated optical carrier wave in order to derive said modulated intermediate frequency electrical signal, and said first and second selected optical frequencies differ by an amount corresponding to said predetermined center frequency of said intermediate frequency electrical signal.

3. An optical telecommunication network as claimed in claim 1, wherein said optical modulating means is in the form of control means for changing the frequency of the optical carrier wave generated by the send oscillator.

4. An optical telecommunication network as claimed in claim 1, wherein the first and second subcarrier frequencies of any terminal differ from those of any other terminal, so that the receive demodulator in any one terminal can separate baseband signals received from two other terminals with which said one terminal is in simultaneous communication.

* * * * *